(12) United States Patent
Ueda

(10) Patent No.: US 6,980,307 B2
(45) Date of Patent: Dec. 27, 2005

(54) PRINTING APPARATUS, METHOD AND PROGRAM PRODUCT

(75) Inventor: Takashi Ueda, Kashiba (JP)

(73) Assignee: Minolta Co., Ltd., Osaka (JP)

(*) Notice: Subject to any disclaimer, the term of this patent is extended or adjusted under 35 U.S.C. 154(b) by 926 days.

(21) Appl. No.: 09/802,987

(22) Filed: Mar. 12, 2001

(65) Prior Publication Data

US 2001/0035970 A1    Nov. 1, 2001

(30) Foreign Application Priority Data

Mar. 17, 2000 (JP) .............................. 2000-076263

(51) Int. Cl.[7] .............................................. B41B 1/00
(52) U.S. Cl. ..................... 358/1.13; 358/1.9; 358/1.15; 358/1.11
(58) Field of Search .............................. 358/1.15, 1.11, 358/1.13, 1.9

(56) References Cited

U.S. PATENT DOCUMENTS

| | | | |
|---|---|---|---|
| 6,351,317 B1 * | 2/2002 | Sasaki et al. ............. | 358/1.15 |
| 6,496,279 B2 * | 12/2002 | Kuroi ....................... | 358/1.9 |
| 6,594,028 B1 * | 7/2003 | Hamamoto et al. ....... | 358/1.15 |
| 6,665,081 B1 * | 12/2003 | Suzuki et al. ............. | 358/1.13 |
| 6,697,165 B2 * | 2/2004 | Wakai et al. .............. | 358/1.11 |

FOREIGN PATENT DOCUMENTS

JP          11-216934          8/1999

* cited by examiner

Primary Examiner—Mark Wallerson
Assistant Examiner—Satwant Singh
(74) Attorney, Agent, or Firm—Buchanan Ingersoll PC

(57) ABSTRACT

A printing apparatus and a printing method capable of reducing the processing time with relatively low cost is provided. In a printing apparatus and a printing method in which print data is created from received job data in accordance with an indication of a command associated with the job data, execution time of each command associated with the received job data is measured, execution number of times of said each command is counted, one or more command(s) to be subjected to replacement processing is determined on the basis of the acquired execution time and execution number of times of each command, and the one or more command(s) is replaced with other command(s) which can be executed in shorter time compared to the determined command(s).

16 Claims, 9 Drawing Sheets

STATISTICS OF COMMAND PROCESSING TIME

STATISTICS OF COMMAND USE NUMBER

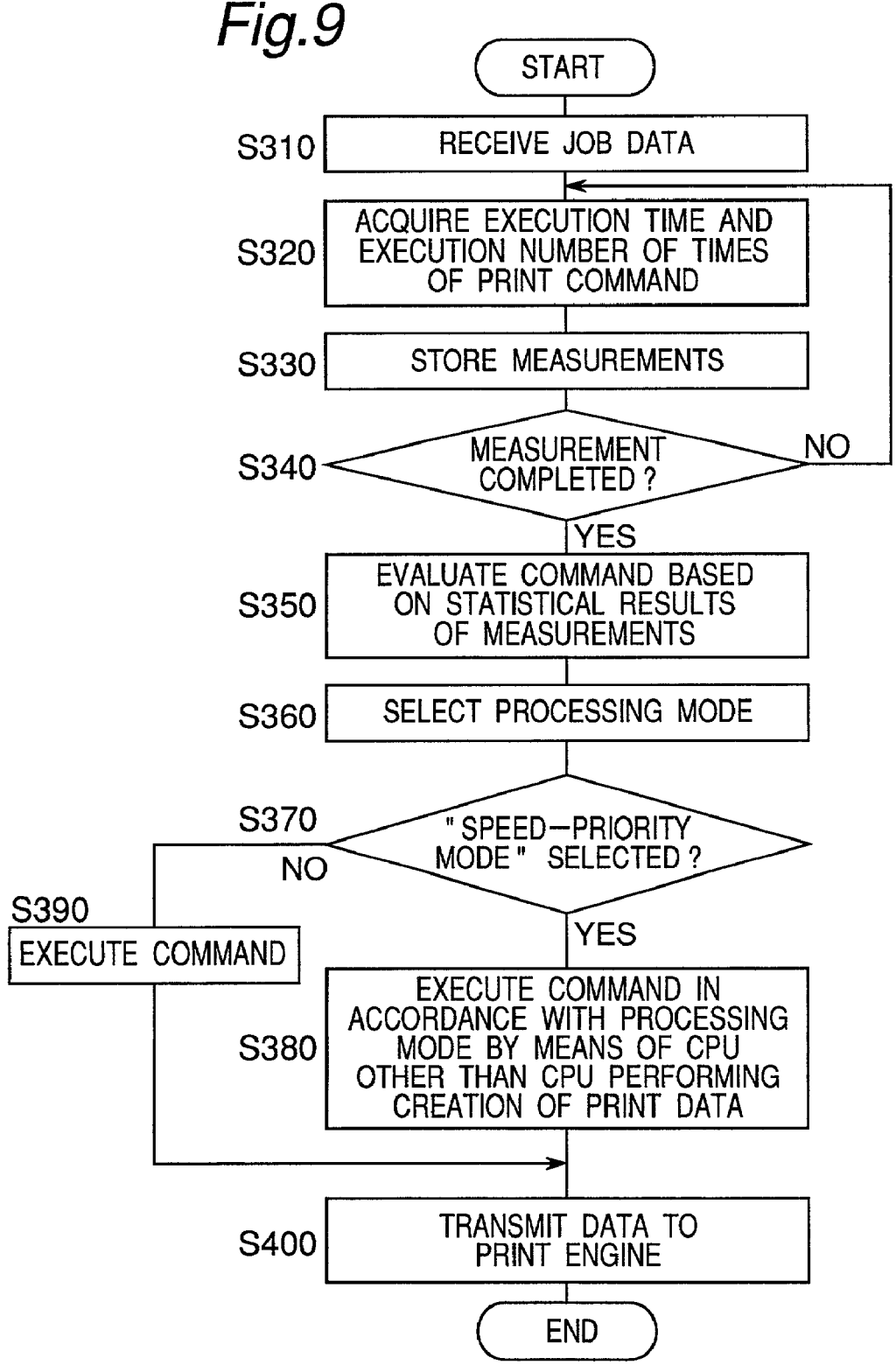

PRINTING APPARATUS, METHOD AND PROGRAM PRODUCT

This application is based on application No. 2000-076263 filed in Japan, the contents of which is hereby incorporated by reference.

BACKGROUND OF THE INVENTION

The present invention relates to a printing apparatus, a printing method and a printing program product.

In the technical field of printing apparatus, speedup of printing is an important problem from the view point of the improvement of the performance. In general, it is image processing executed by a data processing section of a printing apparatus, particularly, processing of converting job data transmitted from the outside into print data such as raster image (so-called RIP (Raster Image Processor) processing), that requires longest time among processes to be executed until print output.

As one procedure for reducing the time of processing executed by a controlling section of the printing apparatus, use of a CPU, peripheral circuits such as RAM, ROM and hardware capable of executing processing at higher speed can be expected. However, in such a case, it is not desirable because the cost of parts increases and hence speedup of the processing will be limited. Furthermore, even if such a CPU or peripheral circuit is used, there is a possibility that the speed of processing is significantly decreased for a certain command depending on the design of the software.

The present invention has been made in consideration of the above-mentioned problems, and an object of the invention is to provide a printing apparatus, a printing method and a printing program product capable of reducing image-processing time with relatively low cost.

SUMMARY OF THE INVENTION

One aspect of the present invention provides a printing apparatus which creates print data from received job data in accordance with an indication of a command associated with the job data and executes printing, the printing apparatus comprising: a receiving section for receiving job data; an execution time measuring section for measuring execution time of each command associated with the received job data; an execution number counting section for counting execution number of times of each command associated with the received job data; a determination section for determining one or more command(s) to be subjected to replacement processing on the basis of the execution time and execution number of times of each command acquired by said execution time measuring section and said execution number counting section, respectively; and a replacement section for executing replacement processing for replacing the command(s) determined by the determination section with other command which can be executed in shorter time. The printing apparatus may further comprise a selecting section for selecting either one of a first mode which gives a priority on processing speed and a second mode which gives a priority on image quality in accordance with an indication by a user, and wherein said determination section does not determine a command to be subjected to the replacement processing in the case where the first mode is selected. Furthermore, the printing apparatus may further comprise a data file storing a plurality of other commands to be used in the replacement processing by said replacement section.

Another aspect of the present invention provides a printing apparatus which creates print data from received job data in accordance with an indication of a command associated with the job data and executes printing, the printing apparatus comprising: a receiving section for receiving job data; an execution time measuring section for measuring execution time of each command associated with the received job data; an execution number counting section for counting execution number of times of each command associated with the received job data; a first processing section; a second processing section; a determination section for determining one or more command(s) to be subjected to parallel processing on the basis of the execution time and execution number of times of each command acquired by said execution time measuring section and said execution number counting section; and a controlling section for controlling said first and second processing sections to execute parallel processing of the job data with which the command determined by said determination section is associated. Said first processing section may usually perform execution of a command associated with job data and conversion of the job data into print data; said second processing section may usually perform processing different from that performed by said first processing section; and said controlling section may perform control so that with respect to the job data with which the command determined by said determination section is associated, said first processing section executes the command and said second processing section converts the job data into print data. Furthermore, the printing apparatus may further comprise a selecting portion for selecting either one of a first mode which gives a priority on processing speed or a second mode which gives a priority on image quality in accordance with an indication by an user, and wherein said determination section determines a command to be subjected to the parallel processing in the case where the first mode is selected, while it does not determine it so in the case where the second mode is selected.

Yet another aspect of the present invention provides a printing method for creating print data from received job data in accordance with an indication of a command associated with the job data, the printing method comprising the steps of: receiving job data; measuring execution time of each command associated with the received job data; counting execution number of times of each command associated with the received job data; determining one or more command(s) to be subjected to replacement processing on the basis of the acquired execution time and execution number of times of each command; and executing replacement processing for replacing the determined command(s) with other command which can be executed in shorter time. Furthermore, the printing method may further comprise the step of selecting either one of a first mode which gives a priority on processing speed and a second mode which gives a priority on image quality in accordance with an indication by a user, and wherein in said determining step, a command is determined to be subjected to the replacement processing in the case where the first mode is selected, while it is not determined so in the case where the second mode is selected.

Still yet another aspect of the present invention provides a printing method for creating print data from received job data in accordance with an indication of a command associated with the job data, the printing method comprising the steps of: receiving job data; measuring execution time of each command associated with the received job data; counting execution number of times of each command associated with the received job data; determining one or more command(s) to be subjected to parallel processing on the basis of the acquired execution time and execution number of times of each command; and controlling first and second processing sections to execute parallel processing of the job data with which the determined command is associated. Said first processing section may usually perform execution of a command associated with job data and conversion of the job data into print data; said second processing section may usually perform processing different from that performed by said first processing section; and in said controlling step, control may be performed so that with respect to the job data with which the command determined in said determining step is associated, said first processing section executes the command and said second processing section converts the job data into print data. Furthermore, the printing method may further comprise the step of selecting either one of a first mode which gives a priority on processing speed or a second mode which gives a priority on image quality in accordance with an indication by an user, and wherein in said determining step, a command is determined to be subjected to the parallel processing in the case where the first mode is selected, while it is not determined so in the case where the second mode is selected.

A yet further aspect of the present invention provides a program product executable by computer for processing job data, the program product making computer execute processing comprising the steps of: receiving job data; measuring execution time of each command associated with the received job data; counting execution number of times of each command associated with the received job data; determining one or more command(s) to be subjected to parallel processing on the basis of the acquired execution time and execution number of times of each command; and executing replacement processing for replacing the determined command(s) with other command which can be executed in shorter time. The processing may further comprise the step of selecting either one of a first mode which gives a priority on processing speed and a second mode which gives a priority on image quality in accordance with an indication by a user, and wherein in said determining step, a command is determined to be subjected to the replacement processing in the case where the first mode is selected, while it is not determined so in the case where the second mode is selected.

A yet further aspect of the present invention provides a program product executable by computer for processing job data, the program product making computer execute processing comprising the steps of: receiving job data; measuring execution time of each command associated with the received job data; counting execution number of times of each command associated with the received job data; determining one or more command(s) to be subjected to replacement processing on the basis of the acquired execution time and execution number of times of each command; and controlling first and second processing sections to execute parallel processing of the job data with which the determined command is associated. Said first processing section may usually perform execution of a command associated with job data and conversion of the job data into print data; said second processing section may usually perform processing different from that performed by said first processing section; and in said controlling step, control may be performed so that with respect to the job data with which the command determined in said determining step is associated, said first processing section executes the command and said second processing section converts the job data into print data. The processing may further comprise the step of selecting either one of a first mode which gives a priority on processing speed or a second mode which gives a priority on image quality in accordance with an indication by an user, and wherein in said determining step, a command is determined to be subjected to the parallel processing in the case where the first mode is selected, while it is not determined so in the case where the second mode is selected.

BRIEF DESCRIPTION OF THE DRAWINGS

FIG. 9 is a flow chart for processing of converting job data into print data by said job data processing section according to the second embodiment.

DETAILED DESCRIPTION OF THE INVENTION

In the following, embodiments of the present invention will be explained with reference to the attached drawings.

First Embodiment

Figure 1:
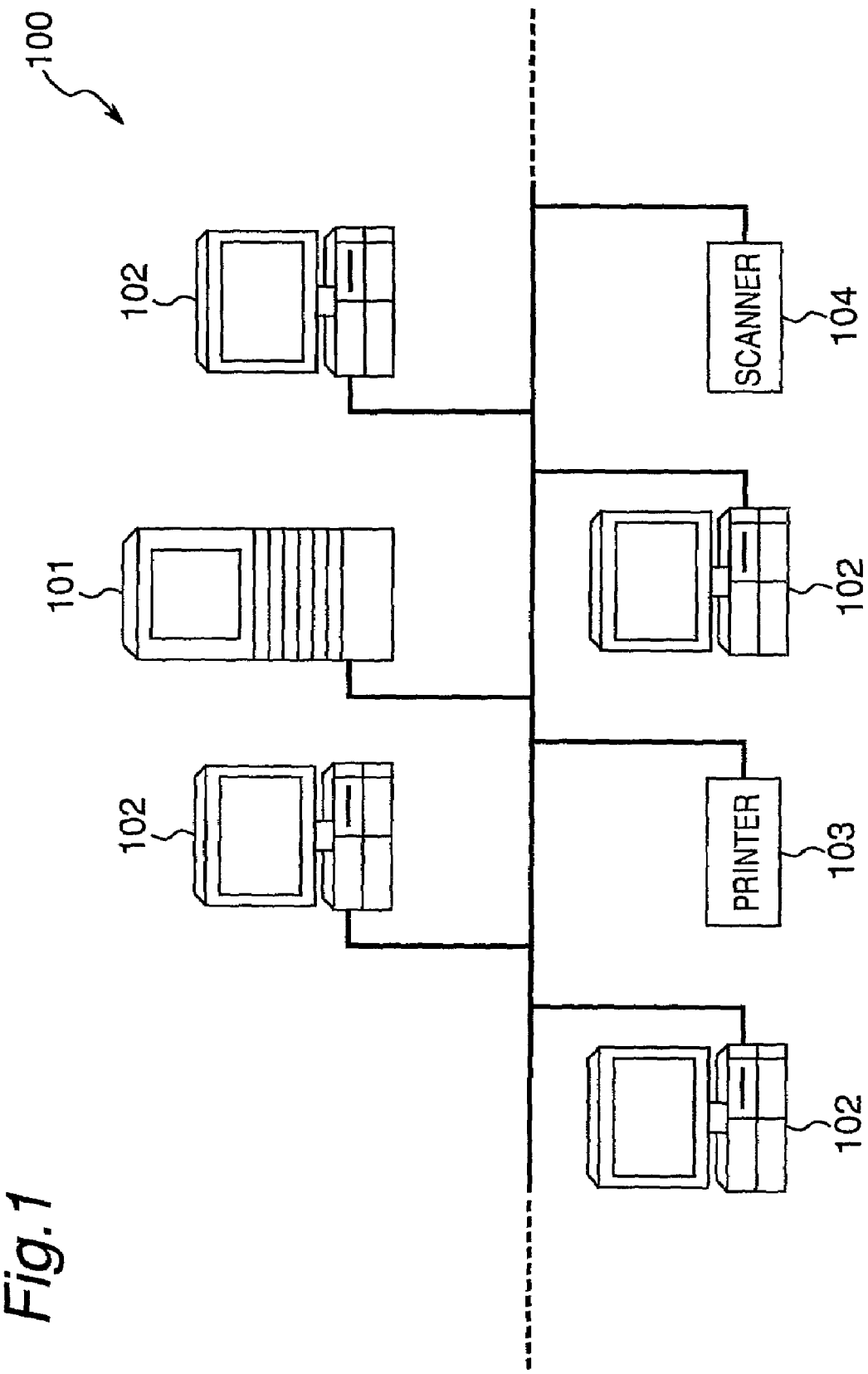
FIG. 1 is an explanatory view showing a network having a printer according to an embodiment of the present invention and a PC for supplying the printer with print data.

FIG. 1 is an explanatory view showing a network including a printing system according to the first embodiment of the invention. This network 100 has a master computer (hereinafter, referred to as a server PC) 101 which executes jobs such as control and management of the entire network and file search requested by other network configuration, a plurality of slave computers (hereinafter, referred to as a client PC) 102, a printer 103 for outputting data transmitted from the client PC 102 in a printed form and a scanner 104 for reading out information such as picture or character on a document to acquire information data.

In this network 100, the printer 103 is shared by the plurality of client PCs 102, and a printer driver (not shown) for controlling the printer 103 is installed in each client PC 102. Said printer 103 receives job data created on the printer driver in each client PC 102 and outputs the data in a printed form.

Figure 2:
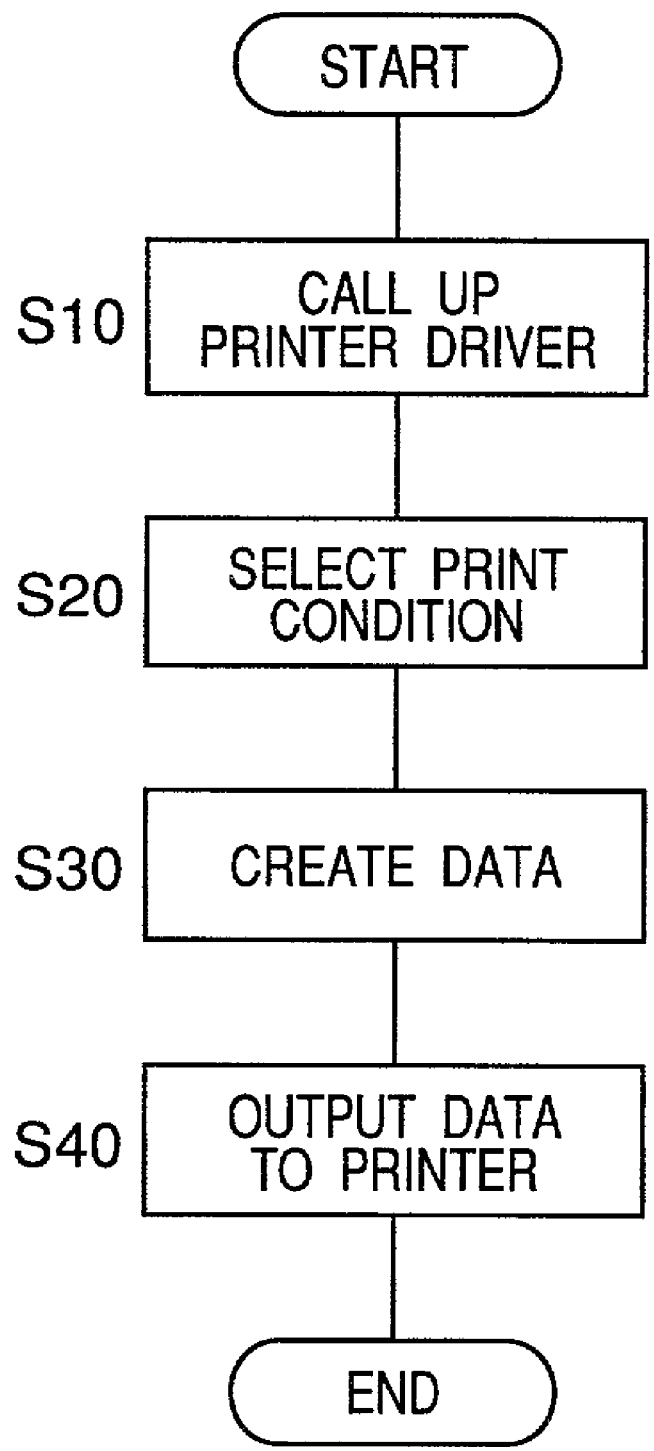
FIG. 2 is a flow chart from print request to data output for the printer in said PC.

FIG. 2 is a flow chart from print request to data output for the printer 103 in each client PC 102. Upon receiving a print request, e.g., from application software, the client PC 102 calls up a printer driver corresponding to a printer which has been previously selected as a destination of data output (S10). After calling up of the printer driver, various printing conditions are designated by reading out from a predetermined memory area or user input on the printer driver (S20). As these printing conditions on the printer driver, it is possible to designate printing forms including, for example, layout printing (2 in 1, 4 in 1, etc.), booklet printing and print-position shifting.

Next, in S30, creation of data suitable for the printer which is a destination of output is started in accordance with a data output indication by a user. In S40, the created data is outputted to the printer 103. This routine ends at this point.

Figure 3:
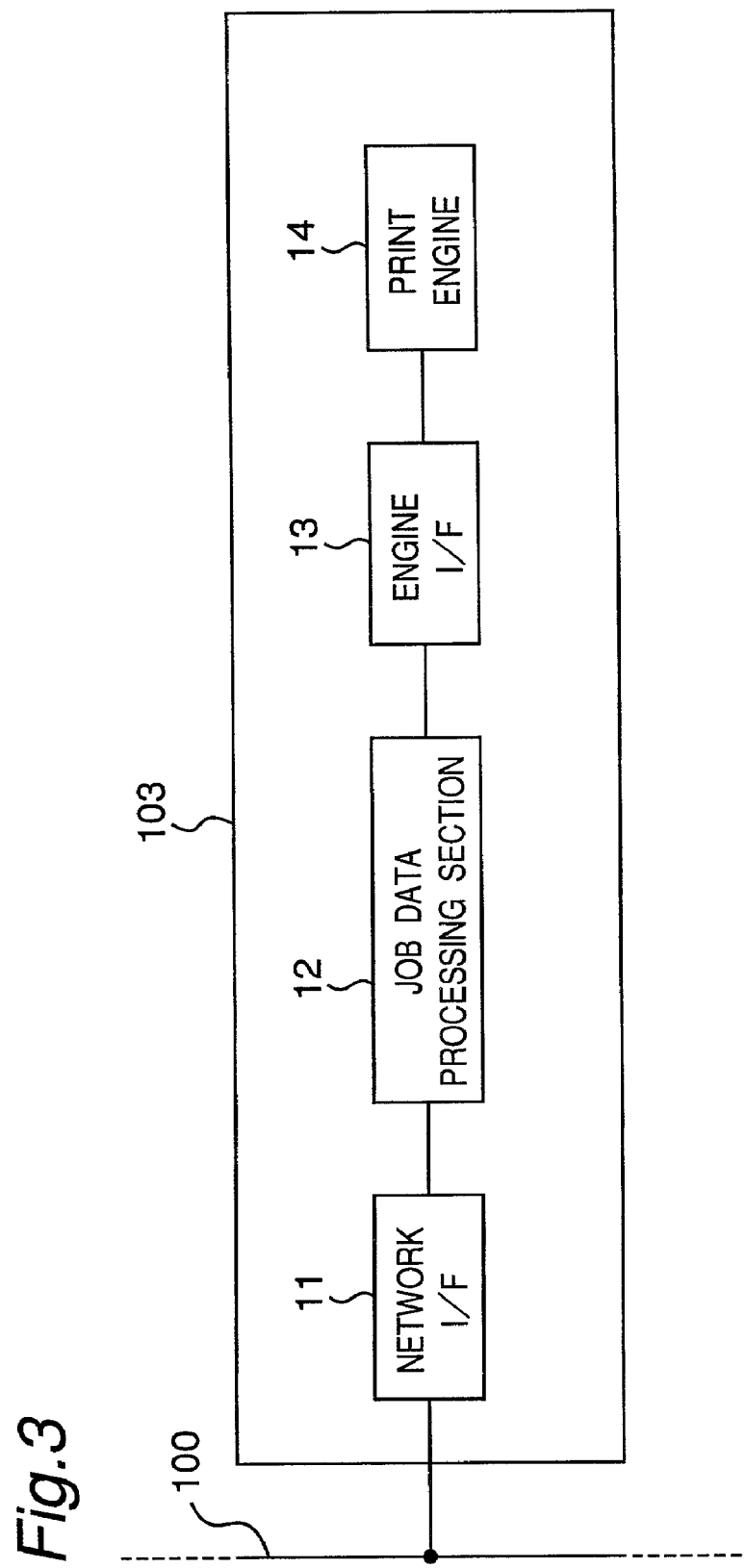
FIG. 3 is a block diagram showing a configuration of the printer according to said first embodiment.

FIG. 3 is a block diagram schematically showing a configuration of the above printer 103. This printer 103 has a network interface (represented by "network I/F" in the drawing) 11 which allows job data transmitted from the client PC 102 via the network 100 to be inputted to the printer 103; a job data processing section 12 for converting the job data into print data according to a print command associated with the job data; an engine interface (represented by "engine I/F" in the drawing) 13; and a print engine 14 for printing the job data on predetermined paper.

In said job data processing section 12, prior to executing the processing of converting job data into print data, it is possible to select a processing mode. As processing modes, there are provided "speed-top-priority mode" in which processing is executed while giving a top priority on the speed, "speed-priority mode" in which processing is executed while giving a priority on the speed and "quality-priority mode" in which processing is executed while giving a priority on the image quality. The user can make an indication to select any one of these modes for print output. In the present embodiment, as will be detailed below, when "speed-top-priority mode" or "speed-priority mode" is selected as the processing mode in the job data processing section 12, a print command associated with the job data is replaced with other command which can be processed in shorter time, whereby the entire processing time is reduced.

Figure 4:
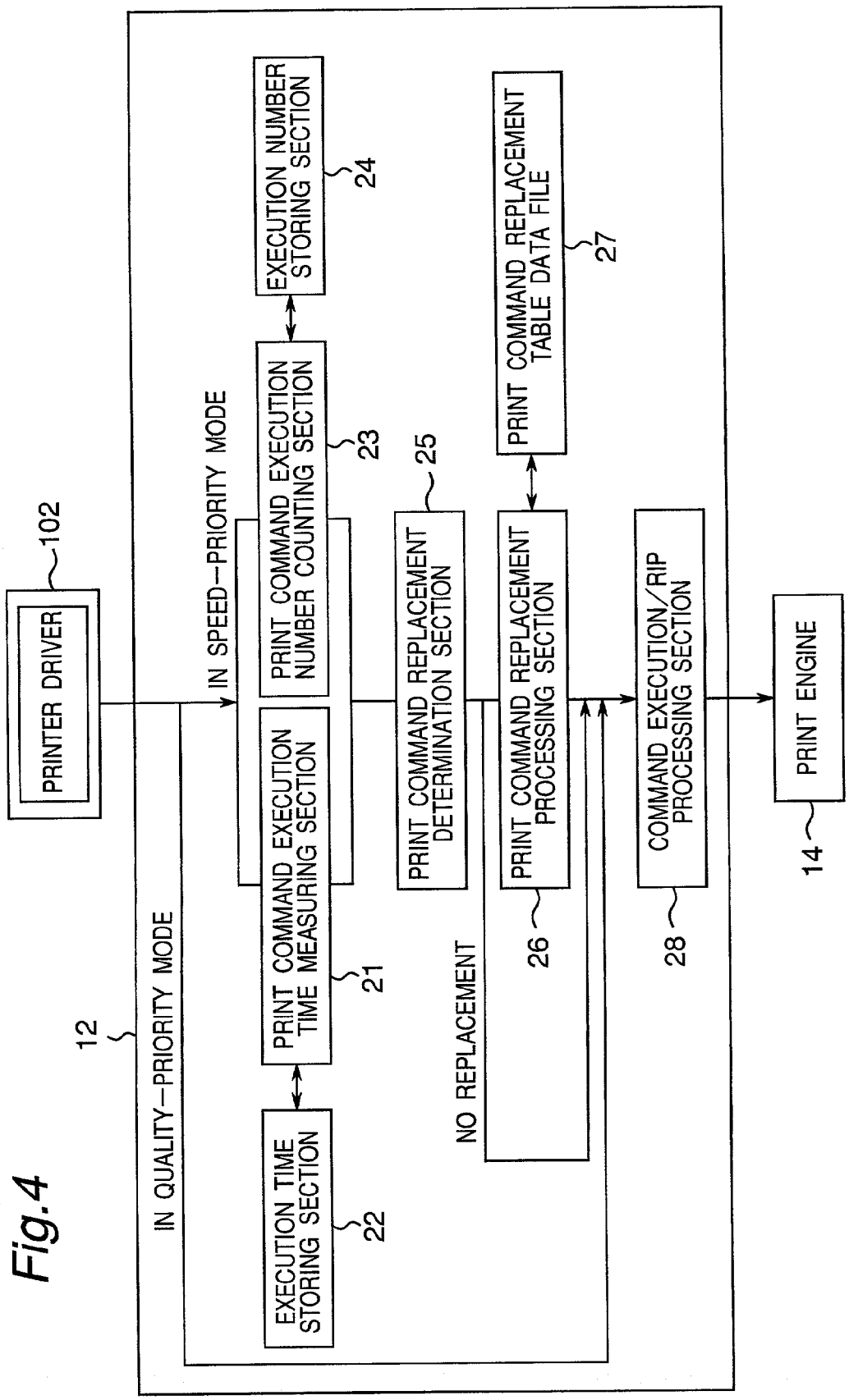
FIG. 4 is a block diagram showing a configuration of a job data processing section in said printer.

FIG. 4 shows a configuration of the job data processing section 12 of the printer 103 according to the first embodiment. The job data processing section 12 has a print command execution time measuring section 21 for measuring execution time of a print command associated with received job data; an execution time storing section 22 for storing the time measured by the print command execution time measuring section 21; a print command execution number counting section 23 for counting execution number of times of print command associated with said job data; and an execution number storing section 24 for storing the number of times counted by the print command execution number counting section 23. Furthermore, the job data processing section 12 has a print command replacement determination section 25 which determines whether replacement processing for replacing a print command associated with job data with other command on the basis of statistical results of measurements stored in the execution time storing section 22 and the execution number storing section 24; a print command replacement processing section 26 for executing replacement processing of print command; a print command replacement table data file 27 which stores a plurality of commands executable in shorter time than the original command and is referred in the replacement processing by the print command replacement processing section 26; and a command execution/RIP processing section 28 which executes a command associated with job data and converts the job data into print data such as raster image data.

Figure 5:
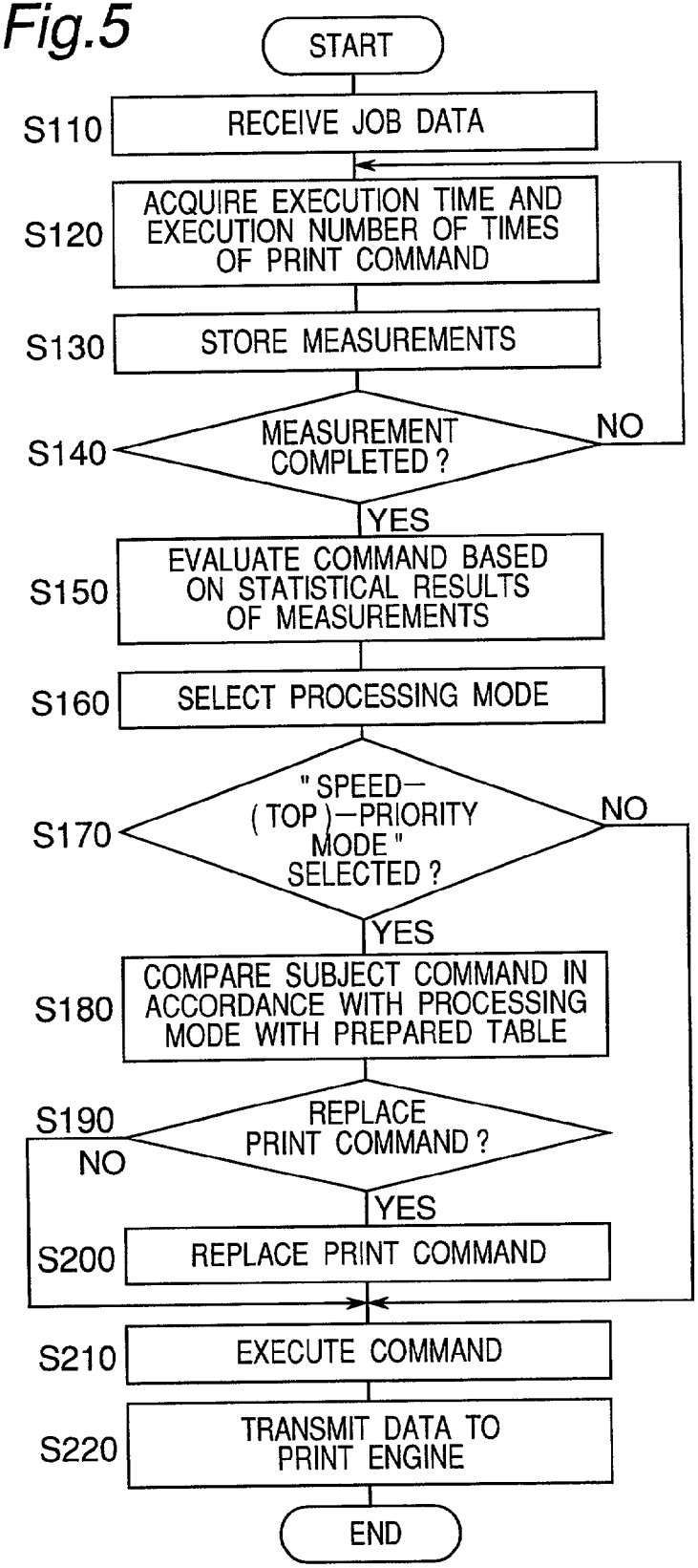
FIG. 5 is a flow chart for processing of converting job data into print data by said job data processing section.

FIG. 5 is a flow chart about processing of converting job data into print data by the job data processing section 12 having the above configuration. Upon receiving a series of job data (S110), the job data processing section 12 measures execution time and execution number of times of print command associated with the job data (S120). The job data processing section 12 makes the execution time storing section 22 and the execution number storing section 24 sequentially store the acquired execution time and execution number of times, respectively (S130). Next, in S140, whether or not measurement of execution time and execution number of times for all print commands of the received job data has completed is determined. As the result, in the case where measurement has not completed, the flow returns to S120 and measurement of execution time and execution number of times of print command associated with the received job data is continued. On the other hand, in the case where measurement has completed, the flow proceeds to S150. While such measurement of execution time and execution number of times of print command is conducted for a series of job data having been transmitted from the client PC 102 as a measurement unit, it may be conducted for any unit, such as for example, for every page.

Figure 6A:
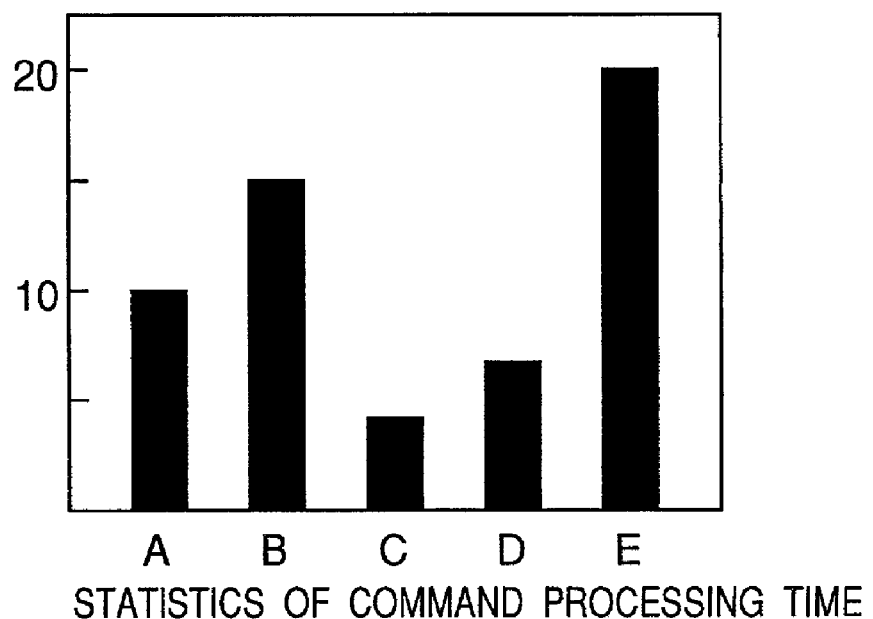
FIG. 6A is a statistical graph for command processing time measured by a command execution time measuring section of said job data processing section.
Figure 6B:
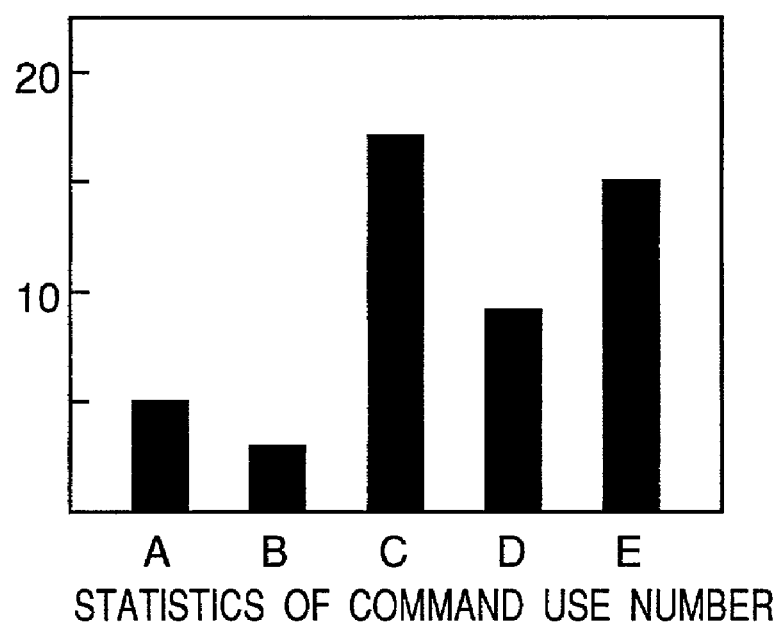
FIG. 6B is a statistical graph for number of times of command use counted by a command execution number counting section of said job data processing section.

In S150 to S190, whether or not replacement processing of replacing print command associated with job data with other command should be executed is determined. First, in S150, statistics of execution time and execution number of times of print command stored in said execution time and execution number storing sections 22, 24 are collected and on the basis of the statistical results, each command is evaluated for the degree that contributes to elongation of the entire processing time of the job data. FIGS. 6A and 6B are graphs showing statistical results for job data, in which FIG. 6A is a statistics graph regarding the command processing time and FIG. 6B is a statistics graph regarding number of times of command use. In the objective job data, there exist Commands A to E which are different with each other.

Additionally, in the Table 1 below, the above-mentioned statistical results of print command execution time and execution number of times and evaluations of commands based on those results are shown in the form of numerals.

TABLE 1

Statistical results of Print Command Execution Time and Execution Number of Times

| Command | Command Processing Time | Command Use Number | Command Evaluation Value |
|---------|------------------------|--------------------|--------------------------|
| A | 10 | 5 | 2 |
| B | 15 | 2 | 3 |
| C | 5 | 18 | 3 |
| D | 8 | 10 | 2 |
| E | 20 | 15 | 1 |

In Table 1, for relatively evaluating Command A to E, evaluation values of "1", "2" and "3" are assigned to each of Commands A to E in the order with long processing time and much use frequency or in the order with the large degree that contributes to elongation of the entire processing time of job data. In this case, evaluation value "1" is assigned to Command E requiring the longest command processing time and the second largest number of times of command use, which is thus defined as a command having the highest necessity to be replaced with other command requiring shorter processing time.

In S160, on the basis of an indication of the user, the processing mode in processing of converting job data into print data is selected from "speed-top-priority mode", "speed-priority mode" and "quality-priority mode". In the present embodiment, according to the respective processing modes and on the basis of evaluation values of each of Commands A to E in the above Table 1, a command to be subjected to the command replacement processing is determined. That is, in the case where "speed-top-priority mode" is selected for the processing mode, Command E with evaluation value "1" and Commands A and D with evaluation value "2" are subjects for the replacement processing, whereas in the case where "speed-priority mode" is selected, only Command E with evaluation value "1" in Table 1 is a subject for the replacement processing. Furthermore, in the case where "quality-priority-mode" is selected, none of the commands is determined as a subject for the replacement processing, and execution will be made in the original state.

Next, in S170, whether or not "speed-top-priority mode" or "speed-priority mode" is selected is determined. As the result, in the case where "speed-top-priority mode" or "speed-priority mode" is not selected, that is "quality-priority mode" is selected, the flow proceeds to S210 where a print command associated with job data is executed in the original state and print data is created from the job data. On the other hand, in the case where "speed-top-priority mode" or "speed-priority mode" is selected, the flow proceeds to S180 where the commands which are subjects for the command replacement processing according to the respective modes are compared with commands in the table prepared in advance in respect of processing speed, and in S190, whether or not replacement processing of print command is executed is determined on the basis of the comparison result. As a result of this, if it is determined that the processing time is shorter in the case of not executing replacement processing of command, the flow proceeds to S210 where the print command associated with the job data is executed in the original state, and print data is created from the job data. On the other hand, if it is determined that the processing time is shorter in the case of executing replacement processing of command, the flow proceeds to S200.

In S200, the print command is replaced with a command requiring shorter processing time by means of the print command replacement processing section 26 and with reference to the print command replacement table data file 27. Table 2 below shows the print command replacement table file 27 used in the present embodiment.

TABLE 2

Command Replacement Table Data File

| Command | Command after replacement |
|---------|---------------------------|
| A       | a + h                     |
| D       | a + j + k                 |
| E       | j + m + n + o             |

Figure 7A:
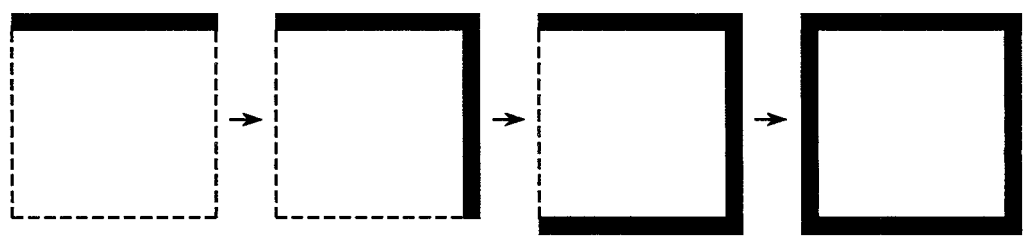
FIG. 7A is a view showing steps of executing a command for drawing a square frame in an original state.
Figure 7B:
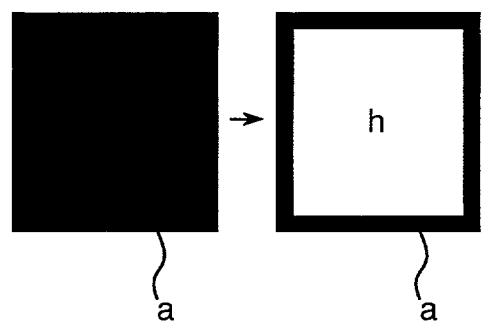
FIG. 7B is a view showing steps of executing the command of FIG. 7A after replacing it with a command which requires shorter processing time.

In Table 2 above, the characters "a", "h", "j", "k", "m", "n", "o" each represent figures having certain shapes and sizes, as the character "a" representing a black square, and "h" representing a white square. After replacement processing in S200, the flow proceeds to S210 where the command after replacement is executed. FIGS. 7A and 7B are explanatory views showing an embodiment of replacement processing with respect to a command for drawing a square frame ("Command A" in the data file of Table 2). FIG. 7A shows drawing steps in the case where Command A is executed in the original state, while FIG. 7B shows drawing steps in the case where a command after replacement is executed. In FIG. 7A, the square frame consists of combination of four straight lines, which are drawn one by one in succession. To the contrary, in FIG. 7B, first a black square "a" is drawn, then a size smaller white square "h" is overlapped on the black square "a", resulting in a square frame. That is, the square frame is drawn in four steps in the case of FIG. 7A and in 2 steps in the case of FIG. 7B, so that the case of FIG. 7B requires shorter processing time compared to the case of FIG. 7A.

However, in the case of FIG. 7B, since the original command is replaced with other command to give a priority on the processing speed, there is a possibility that the resulting figure has some difference, such as change in line thickness, crosshatch pattern and color, from the figure drawn based on the original command. For this reason, in the above-described command replacement processing, the command after replacement is set in relation to the original command so that such difference is suppressed to fall within the range that does not cause a hitch in recognizing the figure.

After processing of command execution in S210, the flow proceeds to S220 where print data resulting from processing of the job data based on the print command is transmitted to the print engine 14.

Such processing of converting job data into print data in S110 to S220 is executed on the basis of an operating program incorporated into the printer 103, and in the present embodiment, said program is stored in a nonvolatile memory (not shown) in the printer 103. Not being limited to the above, such program may be stored in an external memory medium such as floppy disc and CD-ROM, for example, in a file form.

As described above, in the first embodiment, on the basis of measurement of execution time and execution number of times of all commands of the received job data, a command highly contributing to elongation of the entire processing time is determined, and the command is replaced with a command that requires shorter processing time, with the result that it becomes possible to reduce the entire processing time of job data. As a result of this, it is possible to improve the performance of the printing apparatus with relatively low cost without requiring an expensive CPU or peripheral circuit for executing high-speed operation processing.

Furthermore, in the first embodiment, since statistics of execution time and execution number of times of the print command are collected for each series of job data, and each command is evaluated based on the statistical results, a preferred command can be set every time the user uses the printer 103 to reduce the entire processing time of the job data.

Second Embodiment

Figure 8:
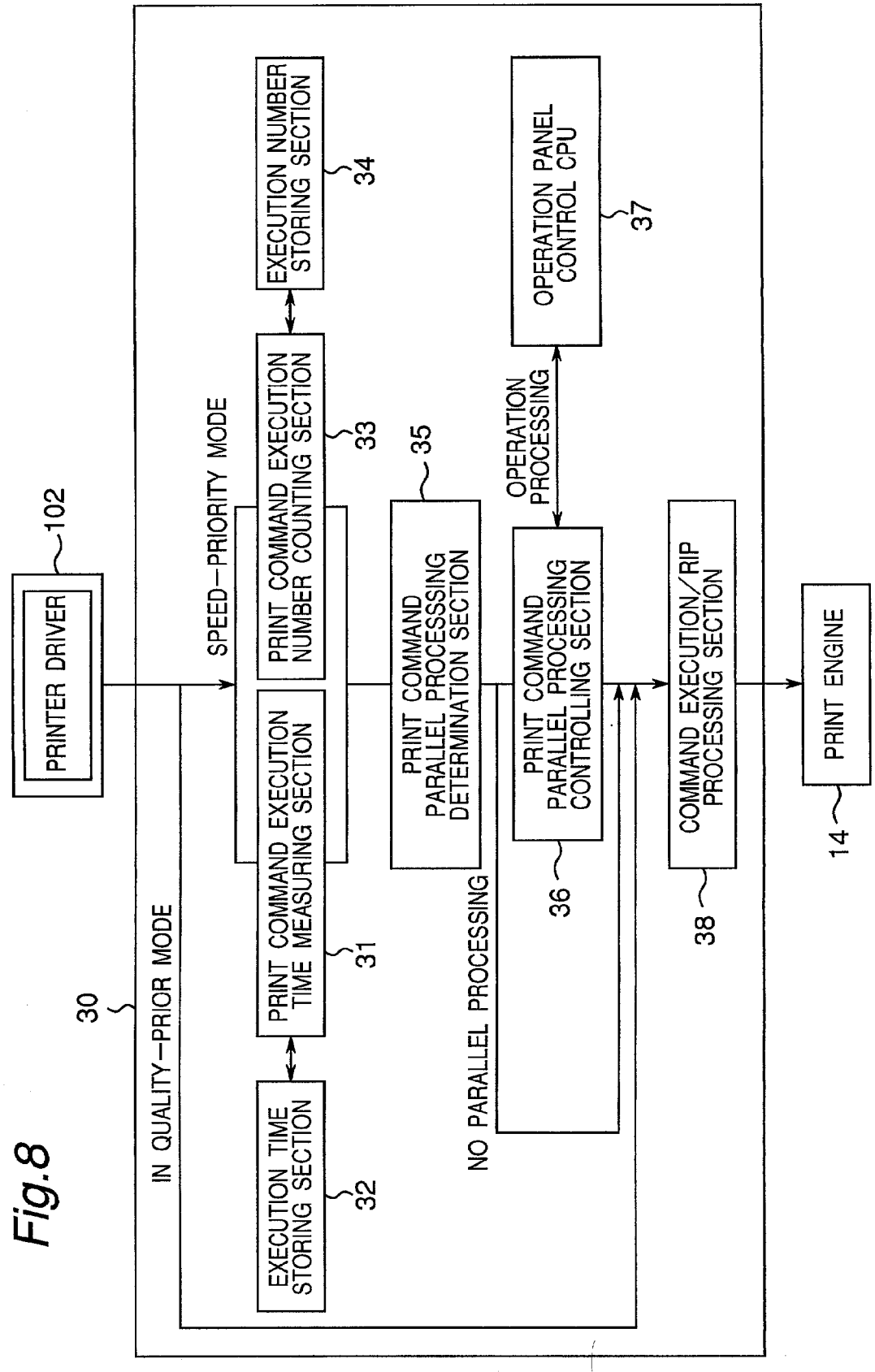
FIG. 8 is a block diagram showing a configuration of a job data processing section in a printer according to the second embodiment of the present invention.

FIG. 8 shows a configuration of a job data processing section 30 according to the second embodiment of the present invention (corresponding to job data processing section 12 in the above-described first embodiment). The job data processing section 30 has a print command execution time measuring section 31 for measuring executing time of print command associated with received job data; an execution time storing section 32 for storing the time measured by the print command execution time measuring section 31; a print command execution number counting section 33 for counting execution number of times of print command associated with said job data; and an execution number storing section 34 for storing the number of times counted by the print command execution number counting section 33. Furthermore, the job data processing section 30 has a print command parallel processing determination section 35 which determines, on the basis of the statistical result of measurement stored in said execution time storing section 32 and the execution number storing section 33, whether or not execution of a specific command and creation of the print data should be performed in parallel by a plurality of processing means; a print command parallel processing controlling section 36 for controlling parallel processing of print command; an operation panel control CPU 37 for executing a specific command; and a command execution/RIP processing section 38 for executing a command associated with job data while converting the job data into print data such as raster image. Said command execution/RIP processing section 38 and the operation panel control CPU 37 correspond to "first processing section" and "second processing section" of the invention, respectively.

Likewise the case of the above-described first embodiment, the job data processing section 30 having such configuration measures execution number of times and execution time of each print command and, on the basis of statistical results of measurements, evaluates each print command in respect of the degree that contributes to elongation of the entire processing time of the job data. In the second embodiment, a command which is evaluated to have a high degree is executed by a CPU other than the CPU for creating print data from the job data, and by proceeding creation of print data and execution of command in parallel, it is possible to reduce the entire processing time.

FIG. 9 is a flow chart for processing of converting job data into print data by said job data processing section 30. Upon receiving job data (S310), the job data processing section 30 measures execution time and execution number of times of print command associated with the job data (S320). The job data processing section 30 makes the execution time storing section 32 and the execution number storing section 34 sequentially store the acquired execution time and execution number of times (S330). Next, in S340, whether or not acquisition of execution time and execution number of times of all print commands of the received job data has completed is determined. Then, in the case where acquisition has not completed, the flow returns to S320 and acquisition of execution time and execution number of times of print command associated with the received job data is continued. On the other hand, in the case where acquisition has completed, the flow proceeds to S350.

In S350 to S370, on the basis of the statistical result of the execution time and execution number of times stored in said execution time storing section 32 and the execution number storing section 34, whether or not execution of a specific command and creation of the print data should be performed in parallel by a plurality of processing means is determined. First, in S350, statistics of the execution time and execution number of times of the print command stored in said execution time and execution number storing sections 32, 34 are collected and on the basis of the statistical results, each command is evaluated for the degree that contributes to elongation of the entire processing time of the job data. Table 3 below shows statistical results and evaluation values based on the statistic results in the form of numerals when the statistical results of the print command execution time and execution number of times are obtained in the second embodiment in the same manner as in the above-described first embodiment. As a result of command evaluation, evaluation value "1" is assigned to Command E which requires long processing time and large frequency of use, or contributes to elongation of the entire processing time of the job data in highest degree, which is then determined as a subject command for parallel processing.

TABLE 3

Statistical Results of Print Command Execution Time and Execution Number of Times

| Command | Command Processing Time | Command Use Number | Command Evaluation Value |
|---------|------------------------|---------------------|--------------------------|
| A | 10 | 5 | 0 |
| B | 15 | 2 | 0 |
| C | 5 | 18 | 0 |
| D | 8 | 10 | 0 |
| E | 20 | 15 | 1 |

In S360, on the basis of an indication of the user, a processing mode in the processing of converting job data into print data is set at either one of "speed-priority mode" or "quality-priority mode". In the second embodiment, in the case where "speed-priority mode" is selected as the processing mode, Command E to with evaluation value "1" is determined as a subject for the parallel processing, while in the case where "quality-priority mode" is selected, no command is determined as a subject for the parallel processing and the command is executed in the original state.

Next, in S370, whether "speed-priority mode" is selected or not is determined. Then, in the case where "quality-priority mode" is selected, the flow proceeds to S390 where a print command associated with the job data is executed while print data is created from the job data by means of said command execution/RIP processing section 38. On the other hand, in the case where "speed-priority mode" is selected as the result of the determination in S370, the flow proceeds to S380.

In S380, a command which is a subject for the parallel processing in accordance with "speed-priority mode" (in this embodiment, Command E) is subjected to operation processing by the operation panel control CPU 37 by means of said print command parallel processing controlling section 36. At the same time, as is in the case of "quality-priority mode", creation of print data from job data is performed with the use of said command execution/RIP processing section 38.

After command execution processing in S380 or S390, the flow proceeds to S400 where print data resulting from processing of the job data based on the print command is transmitted to the print engine 14.

As described above, in the second embodiment, in the case where "speed-priority mode" is selected, execution of command and creation of print data from job data are made to be processed in parallel by said operation panel control CPU 37 and said command execution/RIP processing section 38, respectively, resulting that it is possible to prevent operation processing from being concentrated in the command execution/RIP processing section 38 and to reduce the entire processing time of job data. As a result of this, it is possible to improve the performance of the printing apparatus with relatively low cost without requiring an expensive CPU or peripheral circuit for executing high-speed operation processing.

Furthermore, although in the second embodiment, only the operation panel control CPU 37 is designated as the processing means for executing parallel processing together with said command execution/RIP processing section 38, it is also possible to designate other processing means and causes more than 3 processing means to perform parallel processing for execution of command and creation of print data from job data without being limited to the above configuration.

Finally, it is obvious that the present invention is not limited to the embodiments described above, and various kinds of modifications and changes in designing may be possible without departing from the scope of the present invention.

What is claimed is:

1. A printing apparatus which creates print data from received job data in accordance with an indication of a command associated with the job data and executes printing, the printing apparatus comprising:
   a receiving section for receiving job data;
   an execution time measuring section for measuring execution time of each command associated with the received job data;
   an execution number counting section for counting execution number of times of each command associated with the received job data;
   a determination section for determining one or more command(s) to be subjected to replacement processing on the basis of the execution time and execution number of times of each command acquired by said execution time measuring section and said execution number counting section; and
   a replacement section for executing replacement processing for replacing the command(s) determined by the determination section with other command which can be executed in shorter time.

2. The printing apparatus according to claim 1, further comprising:
   a selecting section for selecting either one of a first mode which gives a priority on processing speed and a second mode which gives a priority on image quality in accordance with an indication by a user,
   wherein said determination section does not determine a command to be subjected to the replacement processing in the case where the first mode is selected.

3. The printing apparatus according to claim 1, further comprising:
   a data file storing a plurality of other commands to be used in the replacement processing by said replacement section.

4. A printing apparatus which creates print data from received job data in accordance with an indication of a command associated with the job data and executes printing, the printing apparatus comprising:
   a receiving section for receiving job data;
   an execution time measuring section for measuring execution time of each command associated with the received job data;
   an execution number counting section for counting execution number of times of each command associated with the received job data;
   a first processing section;
   a second processing section;
   a determination section for determining one or more command(s) to be subjected to parallel processing on the basis of the execution time and execution number of times of each command acquired by said execution time measuring section and said execution number counting section; and
   a controlling section for controlling said first and second processing sections to execute parallel processing of the job data with which the command determined by said determination section is associated.

5. The printing apparatus according to claim 4, wherein
   said first processing section usually performs execution of a command associated with job data and conversion of the job data into print data;
   said second processing section usually performs processing different from that performed by said first processing section; and
   said controlling section performs controlling so that with respect to the job data with which the command determined by said determination section is associated, said first processing section executes the command and said second processing section converts the job data into print data.

6. The printing apparatus according to claim 4, further comprising:
   a selecting portion for selecting either one of a first mode which gives a priority on processing speed or a second mode which gives a priority on image quality in accordance with an indication by an user,
   wherein said determination section determines the command to be subjected to the parallel processing in the case where the first mode is selected, while it does not determine it so in the case where the second mode is selected.

7. A printing method for creating print data from received job data in accordance with an indication of a command associated with the job data, the printing method comprising the steps of:
   receiving job data;
   measuring execution time of each command associated with the received job data;
   counting execution number of times of each command associated with the received job data;
   determining one or more command(s) to be subjected to replacement processing on the basis of the acquired execution time and execution number of times of each command; and
   executing replacement processing for replacing the determined command(s) with other command which can be executed in shorter time.

8. The printing method according to claim 7, further comprising the step of:
   selecting either one of a first mode which gives a priority on processing speed and a second mode which gives a priority on image quality in accordance with an indication by a user,
   wherein in said determining step, a command is determined to be subjected to the replacement processing in the case where the first mode is selected, while the command is not determined so in the case where the second mode is selected.

9. A printing method for creating print data from received job data in accordance with an indication of a command associated with the job data, the printing method comprising the steps of:
   receiving job data;
   measuring execution time of each command associated with the received job data;
   counting execution number of times of each command associated with the received job data;
   determining one or more command(s) to be subjected to parallel processing on the basis of the acquired execution time and execution number of times of each command; and
   controlling first and second processing sections to execute parallel processing of the job data with which the determined command is associated.

10. The printing method according to claim 9, wherein said first processing section usually performs execution of a command associated with job data and conversion of the job data into print data;

said second processing section usually performs processing different from that performed by said first processing section; and in said controlling step, control is performed so that with respect to the job data with which the command determined in said determining step is associated, said first processing section executes the command and said second processing section converts the job data into print data.

11. The printing method according to claim 9, further comprising the step of:

selecting either one of a first mode which gives a priority on processing speed or a second mode which gives a priority on image quality in accordance with an indication by an user, wherein in said determining step, a command is determined to be subjected to the parallel processing in the case where the first mode is selected, while the command is not determined so in the case where the second mode is selected.

12. A program product executable by computer for processing job data, the program product stored on a computer readable medium and making the computer execute processing comprising the steps of:

receiving job data;

measuring execution time of each command associated with the received job data;

counting execution number of times of each command associated with the received job data;

determining one or more command(s) to be subjected to replacement processing on the basis of the acquired execution time and execution number of times of each command; and executing replacement processing for replacing the determined command(s) with other command which can be executed in shorter time.

13. The program product according to claim 12, wherein said processing further comprises the step of:

selecting either one of a first mode which gives a priority on processing speed and a second mode which gives a priority on image quality in accordance with an indication by a user, wherein in said determining step, a command is determined to be subjected to the replacement processing in the case where the first mode is selected, while the command is not determined so in the case where the second mode is selected.

14. A program product executable by computer for processing job data, the program product stored on a computer readable medium and making the computer execute processing comprising the steps of:

receiving job data;

measuring execution time of each command associated with the received job data;

counting execution number of times of each command associated with the received job data;

determining one or more command(s) to be subjected to parallel processing on the basis of the acquired execution time and execution number of times of each command; and controlling first and second processing sections to execute parallel processing of the job data with which the determined command is associated.

15. The program product according to claim 14, wherein said first processing section usually performs execution of a command associated with job data and conversion of the job data into print data;

said second processing section usually performs processing different from that performed by said first processing section; and in said controlling step, control is performed so that with respect to the job data with which the command determined in said determining step is associated, said first processing section executes the command and said second processing section converts the job data into print data.

16. The program product according to claim 14, wherein said processing further comprises the step of:

selecting either one of a first mode which gives a priority on processing speed or a second mode which gives a priority on image quality in accordance with an indication by an user, wherein in said determining step, a command is determined to be subjected to the parallel processing in the case where the first mode is selected, while the command is not determined so in the case where the second mode is selected.

* * * * *